US012734495B2

(12) United States Patent
Lee et al.

(10) Patent No.: US 12,734,495 B2
(45) Date of Patent: Sep. 15, 2026

(54) BIOGAS REFORMER

(71) Applicant: KOREA INSTITUTE OF MACHINERY & MATERIALS, Daejeon (KR)

(72) Inventors: Dae Hoon Lee, Daejeon (KR); Hong Jae Kang, Daejeon (KR); Ho Hyun Song, Daejeon (KR); Young Hoon Song, Daejeon (KR); Kwan Tae Kim, Sejong (KR); You Na Kim, Seoul (KR); Hee Soo Lee, Gwacheon-si (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 375 days.

(21) Appl. No.: 17/927,966

(22) PCT Filed: Mar. 8, 2022

(86) PCT No.: PCT/KR2022/003281
§ 371 (c)(1),
(2) Date: Nov. 28, 2022

(87) PCT Pub. No.: WO2022/191589
PCT Pub. Date: Sep. 15, 2022

(65) Prior Publication Data

US 2023/0415114 A1 Dec. 28, 2023

(30) Foreign Application Priority Data

Mar. 10, 2021 (KR) ........................ 10-2021-0031585
Jun. 23, 2021 (KR) ........................ 10-2021-0081768

(51) Int. Cl.
*B01J 8/00* (2006.01)
*B01J 19/08* (2006.01)

(52) U.S. Cl.
CPC ............. *B01J 8/008* (2013.01); *B01J 19/088* (2013.01); *B01J 2208/00407* (2013.01); *B01J 2208/00504* (2013.01)

(58) Field of Classification Search
CPC ...................... B01J 8/008; B01J 19/088; B01J 2208/00407; B01J 2208/00504;
(Continued)

(56) References Cited

U.S. PATENT DOCUMENTS 6,180,396 B1 1/2001 Ono et al.
2010/0021340 A1* 1/2010 Buske ....................... A61L 2/14 422/28

(Continued)

FOREIGN PATENT DOCUMENTS

| | | |
|---|---|---|
| JP | 2003300703 | 10/2003 |
| JP | 2021-503034 | 2/2021 |
| KR | 10-2015-0093652 | 8/2015 |
| KR | 10-2016-0022640 | 3/2016 |
| KR | 10-2018-0116952 | 10/2018 |

OTHER PUBLICATIONS

Machine translation of KR20180116952 (Year: 2018).*

*Primary Examiner* — Xiuyu Tai
(74) *Attorney, Agent, or Firm* — LEX IP MEISTER, PLLC

(57) ABSTRACT

The present disclosure provides a biogas reformer in which a portion of biogas feed can be combusted in a burner to supply the required heat amount to a catalytic reactor without supplying heat from an external heat source, and the $CO_2$:$CH_4$ ratio can be adjusted to be advantageous for a catalytic reforming reaction of the biogas by supplying a combustion effluent together with the biogas feed to the catalytic reactor.

17 Claims, 10 Drawing Sheets

(58) Field of Classification Search
CPC ...................... B01J 19/0006; B01J 8/02; B01J 2219/0896; B01J 2219/0869; B01J 2219/0875; B01J 2219/0849; B01J 2219/0807; B01J 2219/0894; B01J 2219/0841; B01J 2219/0839; B01J 19/0807; B01J 8/24; B01J 8/20; B01J 8/18; B01J 8/004; B01J 38/30; B01J 38/02; B01J 2208/00884; B01J 2208/00176; B01J 2208/00867; C10G 11/18; C10G 2300/70; C10G 11/182; C10G 2300/4081; F23C 10/20; F23C 10/22; F23C 2900/03002; F23C 2900/99005; F23C 6/047; F23C 10/01; F23C 10/26; F23C 10/04; F23N 2239/04; F23N 1/02; H05H 1/44; H05H 1/3484; B01D 53/04; B01D 2257/2045; B01D 2257/30; Y02E 60/36
See application file for complete search history.

(56) References Cited

U.S. PATENT DOCUMENTS

2010/0329940 A1* 12/2010 Takahashi ................. C01B 3/38
422/186.04
2016/0121296 A1* 5/2016 Hong ..................... B01J 19/088
422/186.29
2016/0311684 A1 10/2016 Milanov et al.

* cited by examiner

【Fig 1】
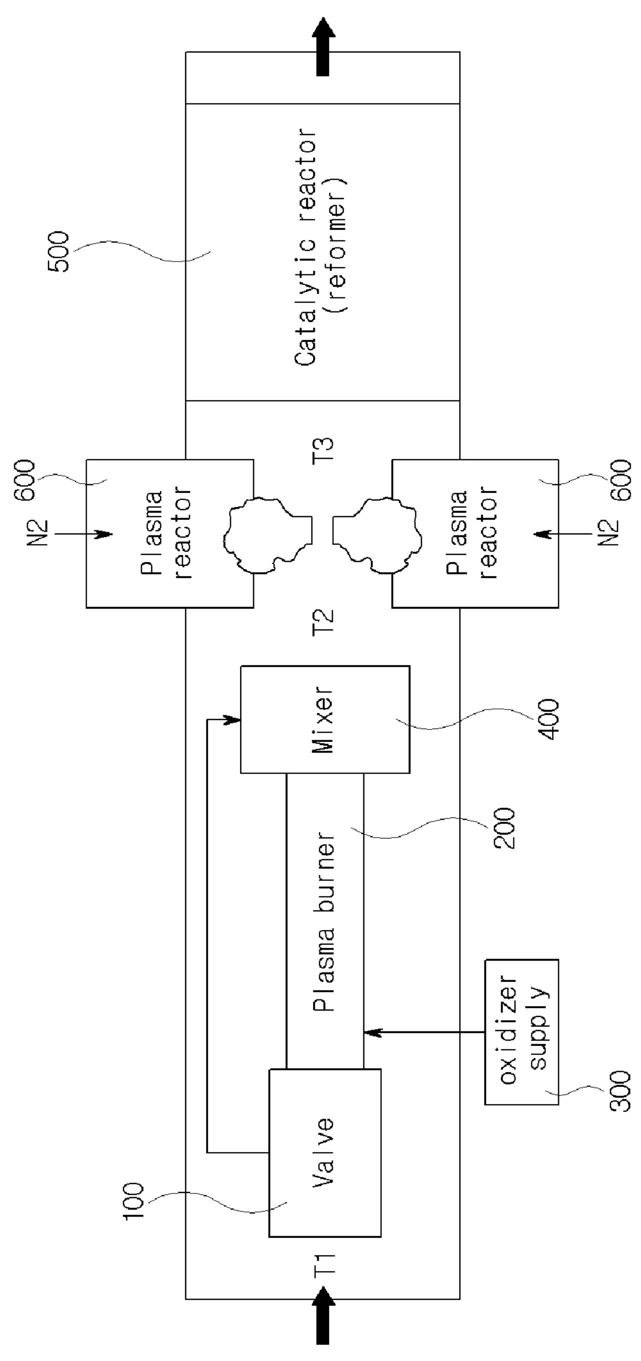

【Fig 2】
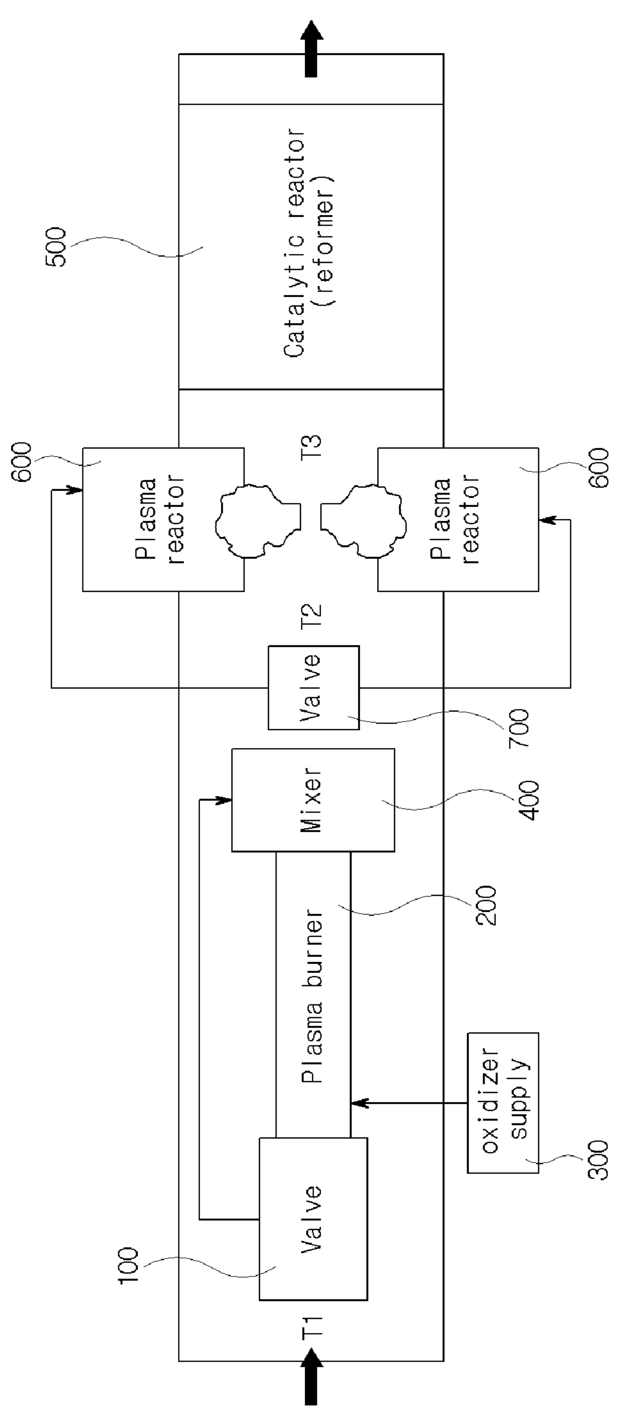

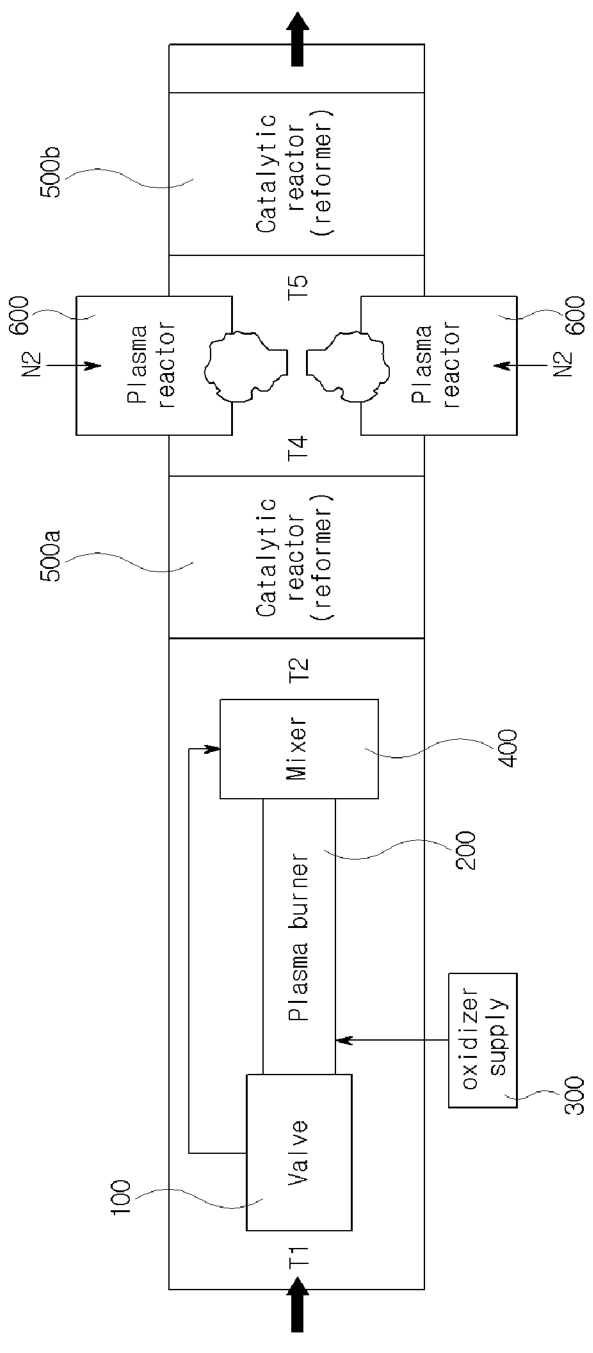
【Fig 3】

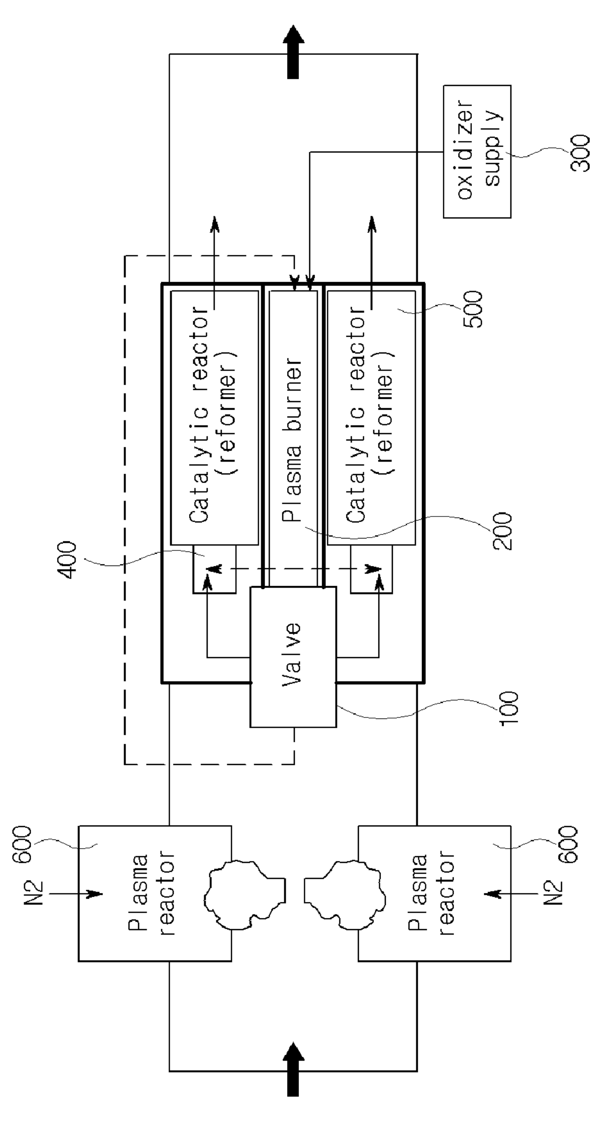
[Fig 4]
Plasma reactor
N2
600
Plasma reactor
N2
600
Valve
100
Catalytic reactor (reformer)
Plasma burner
Catalytic reactor (reformer)
400
200
500
oxidizer supply
300

[Fig 5]
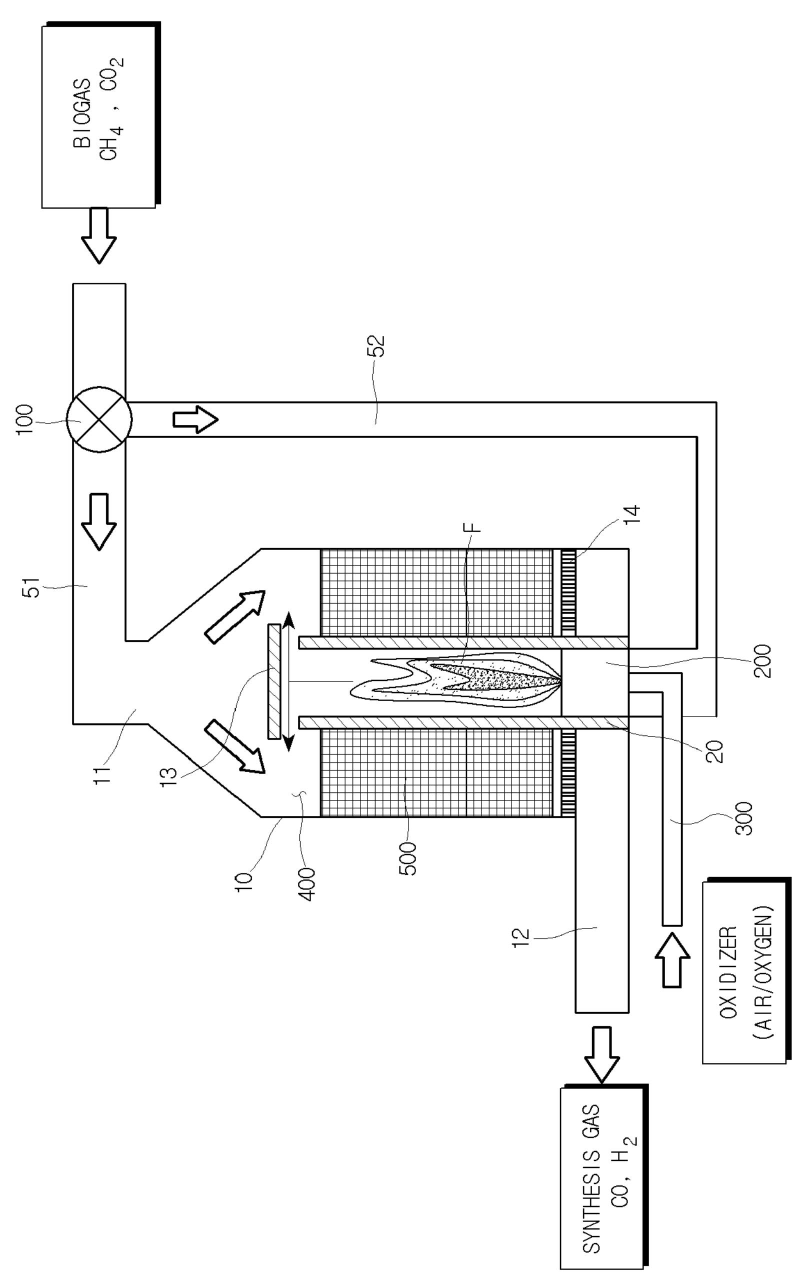

【Fig 6】
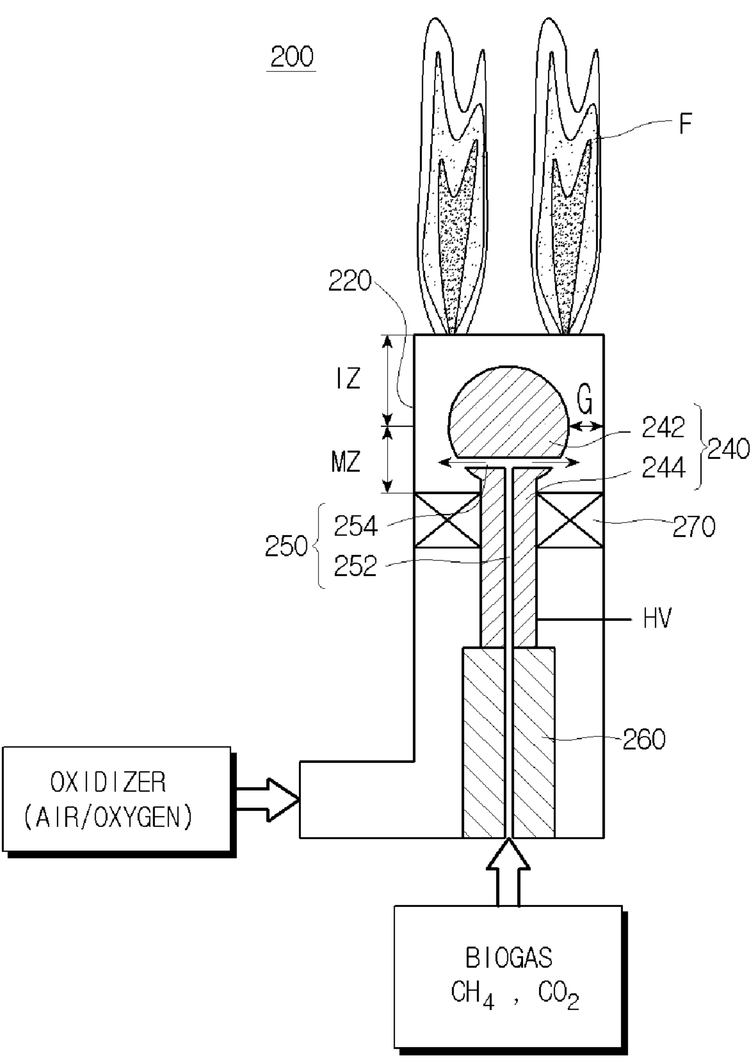

【Fig 7】
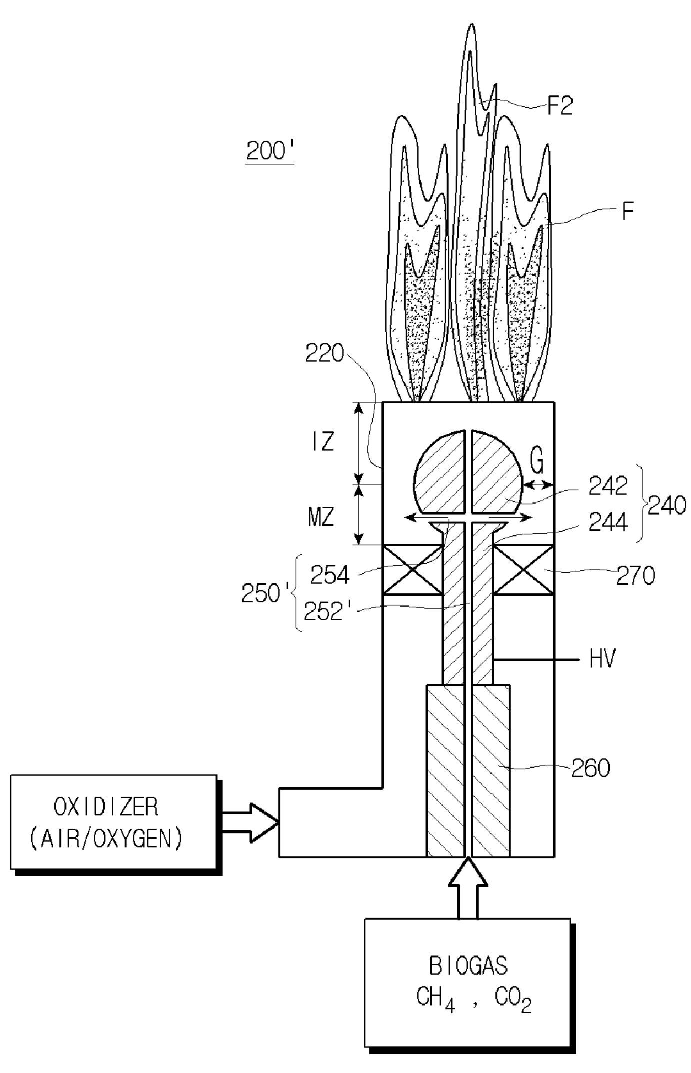

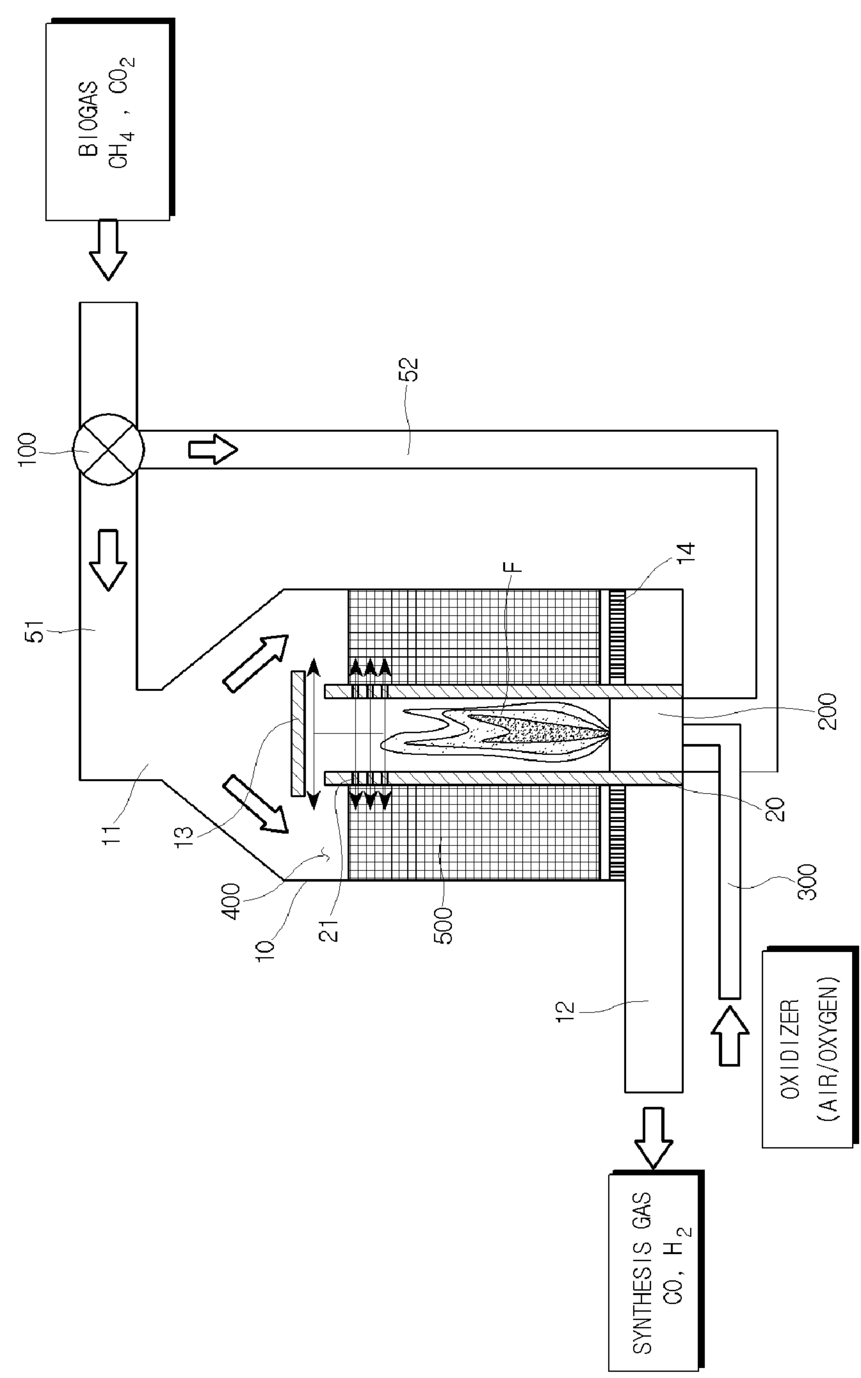
[Fig 8]

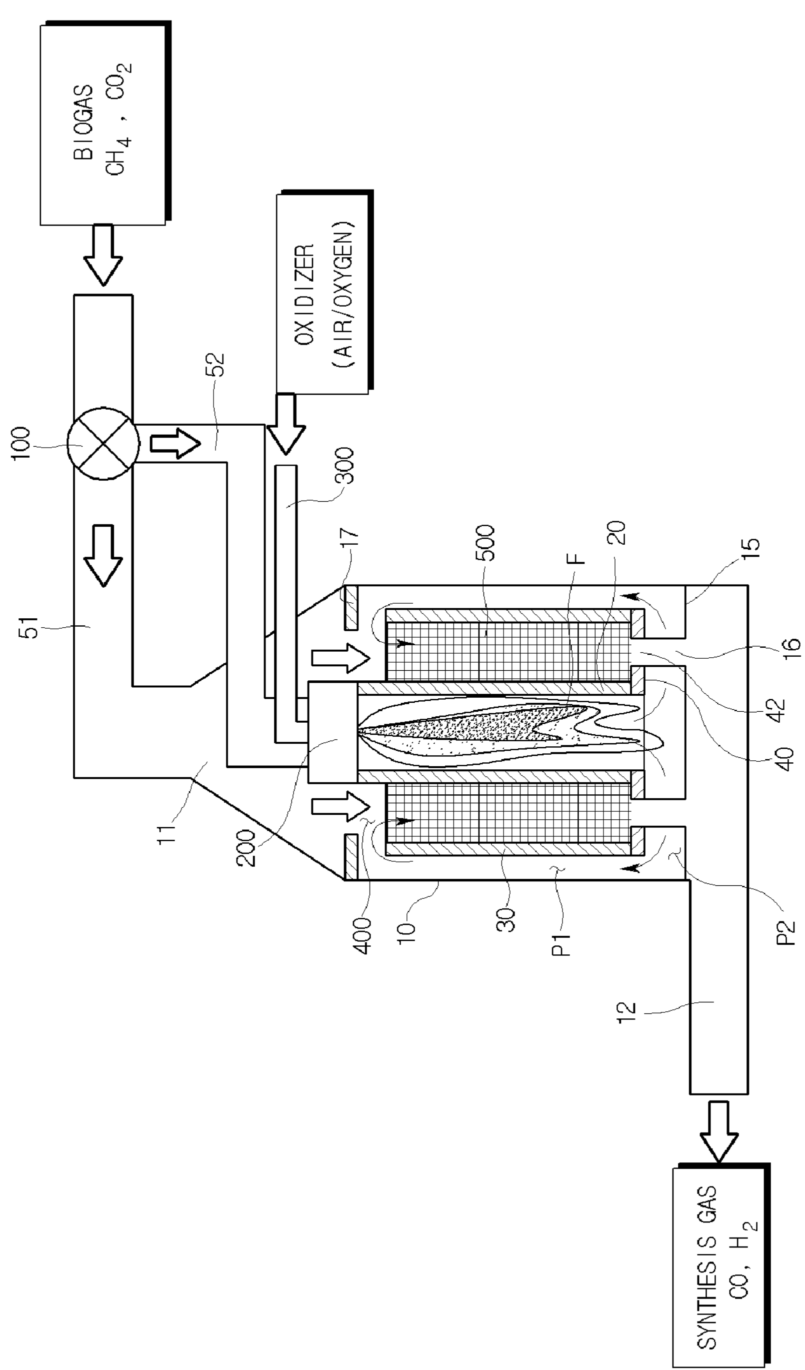
[Fig 9]

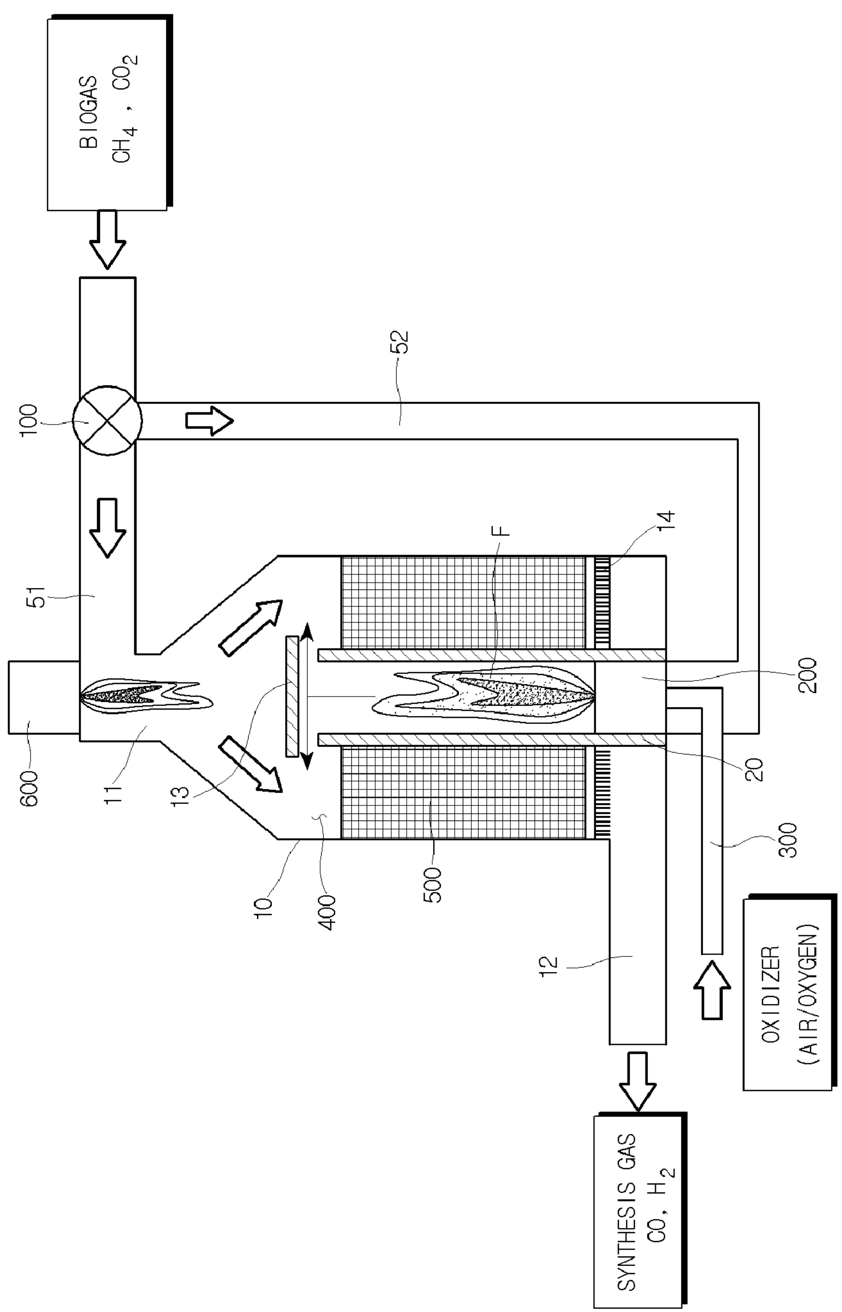
[Fig 10]

BIOGAS REFORMER

CROSS REFERENCE TO RELATED APPLICATION

The present application claims priority to Korea Patent Application No. 2021-0031585, filed Mar. 10, 2021, and No. 2021-0081768, filed Jun. 23, 2021, the entire contents of which is incorporated herein for all purposes by this reference.

TECHNICAL FIELD

The present disclosure relates to a biogas reformer, and more particularly, a biogas reformer in which a portion of biogas feed can be combusted in a burner to supply a required heat amount to a catalytic reactor without supplying heat from an external heat source, and the $CO_2$:$CH_4$ ratio can be adjusted to be advantageous for a catalytic reforming reaction of the biogas by supplying a combustion effluent together with the biogas feed to the catalytic reactor.

BACKGROUND ART

As is known, as greenhouse gas reduction has become an important issue, studies are being made to convert biogas composed of greenhouse gas into synthesis gas and utilize it as fuel, alcohol, hydrogen, and the like.

On the other hand, biogas mainly consists of $CO_2$ and $CH_4$, and $CO_2$ and $CH_4$ can be converted into synthesis gas containing carbon monoxide and hydrogen through a reforming process, that is, $CO_2+CH_4 \rightarrow 2CO+2H_2$. However, in normal biogas, an amount of $CH_4$ is higher than that of $CO_2$, so when the reforming process is performed directly, excess $CH_4$ is discharged into the atmosphere.

In addition, in case of the reforming process, external heat should be continuously supplied to the reactor in order to maintain the reaction due to strong endothermic reaction characteristics. If $CO_2$ is generated to supply an external heat source in this process, the carbon reduction effect of biogas reforming is lowered.

In case of a general reforming reaction, an external heat source is required. In addition, in case of a general catalytic reforming reaction, a large amount of $CO_2$ in a range of $CO_2$:$CH_4$=1:1 to 2:1, compared to $CH_4$ is used to promote the reaction. However, in case of biogas, on the contrary, an amount of $CH_4$ is greater than that of $CO_2$, which causes disadvantages in this reaction.

DISCLOSURE

Technical Problem

The present disclosure aims to provide a biogas reformer in which a portion of biogas feed can be combusted in a burner to supply a required heat amount to a catalytic reactor without supplying heat from an external heat source, and the $CO_2$:$CH_4$ ratio can be adjusted to be advantageous for a catalytic reforming reaction of the biogas by supplying a combustion effluent together with the biogas feed to the catalytic reactor.

The technical problems to be achieved by the present disclosure are not limited to the technical problems mentioned above, and other technical problems not mentioned can be clearly understood by those having ordinary skill in the art to which the present disclosure belongs from the description below.

Technical Solution

The present disclosure provides a biogas reformer that solves problems of requiring an external heat source and a reaction equivalence ratio of $CO_2$:$CH_4$ in a catalytic reforming reaction.

One embodiment is a biogas reformer including: a first control valve for branching biogas feed mainly composed of methane and carbon dioxide into a first portion and a second portion; a burner receiving the second portion of the biogas feed branched through the first control valve and burning the second portion of the biogas feed to generate a high-temperature combustion effluent mainly composed of carbon dioxide and water; a mixer in which the first portion of the biogas feed branched through the first control valve and the combustion effluent generated from the burner are mixed; and a catalytic reactor allowing a mixture mixed in the mixer to be introduced thereinto and generating synthesis gas containing carbon monoxide and hydrogen as main components through a catalytic reforming reaction.

According to the embodiment, the first control valve may adjust a ratio of the second portion to a total amount of the biogas feed to be between 5% and 40%.

According to the embodiment, a ratio of carbon dioxide ($CO_2$):methane ($CH_4$) of the mixture mixed in the mixer may be 1:1 to 2:1.

According to the embodiment, the biogas reformer may further include an oxidizer supply unit for supplying an oxidizer for combustion to the burner.

According to the embodiment, the biogas reformer may further include a plasma reactor for heating the biogas feed or the mixture mixed in the mixer to supply heat to the catalytic reactor.

According to the embodiment, the biogas reformer may further include a second control valve for branching a portion of the biogas feed or the mixture mixed in the mixer and supplying the portion to the plasma reactor.

According to the embodiment, the plasma reactor may be one among an arc jet plasma reactor, a high-frequency inductively coupled plasma reactor and a microwave plasma reactor.

According to the embodiment, the catalytic reactor may include a first catalytic reactor and a second catalytic reactor sequentially disposed along a flow direction of the mixture, and the plasma reactor may be disposed between the first catalytic reactor and the second catalytic reactor.

According to the embodiment, the burner may be provided in an inner housing, and the catalytic reactor may be provided between the inner housing and an outer housing enclosing the inner housing.

According to the embodiment, the biogas reformer may further include a first conduit for supplying the first portion of the biogas feed from the first control valve to an inlet of the outer housing; and a second conduit for supplying the second portion of the biogas feed from the first control valve to the burner.

According to the embodiment, the mixer may be formed between the inlet and the catalytic reactor inside the outer housing.

According to the embodiment, the burner may be a plasma burner that is ignited by plasma and a flame is maintained by plasma.

According to the embodiment, the burner may include: a burner housing coupled to the inner housing and electrically grounded thereto; and an electrode built into the burner housing, to which a high voltage being applied, forming a discharge gap, and forming a feed passageway connected to the second conduit.

According to the embodiment, the electrode may include: a discharging unit taking a convex-shape and forming the discharge gap, and a pillar formed with a smaller diameter than the discharging unit and connected to the discharging unit, and the feed passageway may include: a first inner passageway connected to the second conduit and extending from the pillar toward the discharging unit, and a second inner passageway connected to the first inner passageway within the discharging unit and extending toward the burner housing.

According to the embodiment, the first inner passageway may extend to an end of the discharging unit through the second inner passageway.

According to the embodiment, the burner may further include a swirler provided between the pillar and the burner housing to generate a swirl in the oxidizer to be supplied to the discharge gap.

According to the embodiment, the inner housing may have an open end open toward the inlet, and the outer housing may include a direction shifting member provided in front of the open end of the inner housing to change a traveling direction of the combustion effluent.

According to the embodiment, the first portion of the biogas feed introduced from the inlet may be flowed into an outside of the direction shifting member, mixed with the combustion effluent, and supplied to the catalytic reactor.

According to the embodiment, the inner housing may include a through-hole for supplying the combustion effluent to the catalytic reactor.

According to the embodiment, the biogas reformer may further include: an intermediate housing enclosing the inner housing, and the catalytic reactor may be provided between the inner housing and the intermediate housing, and the combustion effluent may be flowed to a circulating flow path formed between an outer surface of the intermediate housing and an inner surface of the outer housing and be circulated toward the inlet in the circulating flow path.

According to the embodiment, the outer housing may separate an interior of the outer housing into a first interior in which the catalytic reactor is disposed; and a second interior in which the discharging unit through which the synthesis gas generated in the catalytic reactor is discharged is disposed, and may include a partition wall forming the circulating flow path, and a first communication hole through which the catalytic reactor communicates with the second interior may be provided in the partition wall.

According to the embodiment, a perimeter of the inner housing and a perimeter of the intermediate housing may be connected by a connecting portion on an opposite side to the inlet, and the connecting portion may be spaced apart from the partition wall to form a communication flow path through which the combustion effluent is flowed to the circulating flow path, and the connecting portion may be provided with a second communication hole connected to the first communication hole and through which the catalytic reactor communicates with the second interior.

According to the embodiment, the outer housing may include a guide wall provided to protrude inward from the outer housing from a front of the catalytic reactor and guiding the combustion effluent circulated toward the inlet to the catalytic reactor.

According to the embodiment, the biogas reformer may further include a plasma reactor installed in the outer housing to heat the first portion of the biogas feed introduced through the inlet or the mixture mixed in the mixer.

Advantageous Effect

According to the present disclosure, a portion of the biogas feed is burned in the plasma burner, and ignition of biogas and flame maintenance is made possible even under conditions of low heat quantity and high fluctuation of biogas feed, thereby it becomes possible to supply a required heat amount to the catalytic reactor without requiring an external heat source.

In addition, since combustion effluents containing $CO_2$ and $H_2O$ as main components are supplied as materials to the catalytic reactor together with the biogas feed, the reaction equivalence ratio of $CO_2$:$CH_4$ can be adjusted stably, especially can be adjusted to a value between 1:1 and 2:1 to favor the catalytic reforming reaction of biogas for biogas with a high fluctuation in a supply amount.

As a result, since biogas is reformed in the catalytic reactor and converted into synthesis gas, it becomes possible to reduce $CO_2$.

In addition, when heat is transferred from the plasma burner to the catalytic reactor, the heat may be effectively transferred.

In addition, when the heat amount required in the catalytic reactor is changed, it is possible to detect the change and supply the changed heat amount to the catalytic reactor.

The advantageous effects of the present disclosure are not limited to the above effects, and it should be understood to include all effects that can be inferred from the configuration of the disclosure described in the detailed description or claims of the present disclosure.

DESCRIPTION OF DRAWINGS

FIG. 1 is a schematic view illustrating a biogas reformer according to a first embodiment of the present disclosure.

FIG. 2 is a schematic view illustrating a biogas reformer according to a second embodiment of the present disclosure.

FIG. 3 is a schematic view illustrating a biogas reformer according to a third embodiment of the present disclosure.

FIG. 4 is a schematic view illustrating a biogas reformer according to a fourth embodiment of the present disclosure.

FIG. 5 is a cross-sectional view illustrating in detail a positional relationship of the first control valve, the plasma burner, the mixer, and the catalytic reactor of FIG. 4.

FIG. 6 is a cross-sectional view illustrating the plasma burner of FIG. 5 in detail.

FIG. 7 is a cross-sectional view illustrating in detail another embodiment of the plasma burner.

FIG. 8 is a cross-sectional view illustrating in detail another positional relationship of the first control valve, the plasma burner, the mixer, and the catalytic reactor of FIG. 4.

FIG. 9 is a cross-sectional view illustrating in detail still another positional relationship of the first control valve, the plasma burner, the mixer, and the catalytic reactor of FIG. 4.

FIG. 10 is a cross-sectional view of the biogas reformer in detail according to a fifth embodiment of the present disclosure.

MODE FOR INVENTION

Hereinafter, with reference to the accompanying drawings, embodiments of the present disclosure will be described in detail so that those of ordinary skill in the art can easily implement them. However, the present disclosure may be embodied in several different forms and is not limited to the embodiments described herein. In order to clearly explain the present disclosure in the drawings, parts irrelevant to the description are omitted, and the same reference numerals will be used to refer to the same or similar elements throughout the specification.

FIG. 1 is a schematic view illustrating a biogas reformer according to a first embodiment of the present disclosure. Referring to FIG. 1, the biogas reformer of the first embodiment includes largely a first control valve 100, a plasma burner 200, an oxidizer supply unit 300, a mixer 400, a catalytic reactor 500 and a plasma reactor 600.

The biogas feed supplied at a temperature T1 is branched from the first control valve 100 into a first portion of biogas feed and a second portion of biogas feed. At this time, biogas mainly consists of methane ($CH_4$) and carbon dioxide ($CO_2$), but an amount of $CH_4$ is greater than an amount of $CO_2$. For example, $CH_4$ may account for 50 to 60% and $CO_2$ may account for 30 to 40%. A first portion of biogas feed branched through the first control valve 100 is supplied to the mixer 400, and a second portion of biogas feed branched through the first control valve 100 is supplied to the plasma burner 200.

The second portion of biogas feed introduced into the plasma burner 200 acts as a fuel, and at least a portion of $CH_4$ is burned, and accordingly, a high-temperature combustion effluent mainly composed of carbon dioxide ($CO_2$) and water ($H_2O$) is generated (reaction formula 1: $CH_4+2O_2 \rightarrow CO_2+2H_2O$). To this end, an oxidizer supply unit 300 for supplying air or oxygen ($O_2$) as an oxidizer for combustion to the plasma burner 200 is provided. In this embodiment, it is described that the burner is a plasma burner that is ignited by plasma and the flame is maintained by plasma, but is not limited thereto.

In the mixer 400, the first portion of the biogas feed and the combustion effluent generated by the plasma burner 200 are mixed. At this time, the mixture has a temperature T2 higher than the temperature T1 due to the hot combustion effluent. In addition, since the combustion effluent is mainly composed of $CO_2$, an amount of $CO_2$ to $CH_4$ (the ratio of $CO_2$) in the mixture becomes large compared to the first portion of the biogas feed, and in particular, it is preferable to adjust the ratio of $CO_2$:$CH_4$ to 1:1 to 2:1 to favor the catalytic reforming reaction.

An amount of the second portion of biogas feed branched through the first control valve 100 may be adjusted according to a heat amount required in the catalytic reactor 500 and an amount of $CO_2$ required to control the ratio of $CO_2$:$CH_4$ of the mixture. In particular, the first control valve 100 may adjust a ratio of the second portion to the total amount of the biogas feed between 5% and 40%.

The mixture mixed in the mixer 400 is then introduced into the catalytic reactor 500, and in the catalytic reactor 500, synthesis gas having carbon monoxide (CO) and hydrogen ($H_2$) as main components are generated through a catalytic reforming reaction of biogas. (reaction formula 2: $CO_2+CH_4 \rightarrow 2CO+2H_2$). In this case, the reforming reaction of the reaction formula 2 which is a strong endothermic reaction may be maintained by continuously receiving a required heat amount by a combustion heat supplied from the plasma burner 200.

Furthermore, when the heat amount required in the catalytic reactor 500 is not satisfied by the plasma burner 200 according to a change in the composition and amount of the biogas feed, one or more plasma reactor 600 for additionally supplying heat to the catalytic reactor 500 may be further included. In this embodiment, the plasma reactor 600 is installed at a rear end of the mixer 400 and a front end of the catalytic reactor 500 to heat the mixture of a temperature T2 at a temperature T3, which is higher than the temperature T2. However, the present disclosure is not limited thereto, and the plasma reactor 600 may be omitted or the biogas feed may be heated before being mixed in the mixer 400.

In this embodiment, nitrogen ($N_2$) is supplied to the plasma reactor 600 as a discharge gas. The plasma reactor 600 may be one among an arc jet plasma reactor, a high frequency inductively coupled plasma reactor, and a microwave plasma reactor.

Meanwhile, a temperature sensor (not illustrated) may be installed at front and rear ends of the catalytic reactor 500. The detection signal of the temperature sensor makes it possible to determine whether a heat amount required for the catalytic reaction of the catalytic reactor 500 is insufficient or not. Depending on this determination, the plasma reactor 600 may be operated or stopped.

FIG. 2 is a schematic view illustrating a biogas reformer according to a second embodiment of the present disclosure. Referring to FIG. 2, the biogas reformer of the second embodiment differs from the biogas reformer of the first embodiment in that it further includes a second control valve 700, and thus descriptions of parts using the same reference numerals will be omitted.

In this embodiment, a portion of the mixture is supplied as a discharge gas to the plasma reactor 600. To this end, a second control valve 700 is installed at a rear end of the mixer 400, and the second control valve 700 branches a portion of the mixture to supply it to the plasma reactor 600. However, the present disclosure is not limited thereto, and a portion of the biogas feed may be branched by the second control valve 700 and supplied to the plasma reactor 600 before being mixed in the mixer 400.

FIG. 3 is a schematic view illustrating a biogas reformer according to a third embodiment of the present disclosure. Referring to FIG. 3, the biogas reformer of the third embodiment differs from the biogas reformer of the first embodiment only in terms of a configuration of a catalytic reactor 500*a* and 500*b* and a position of the plasma reactor 600, thus descriptions of the same parts using the same reference numerals will be omitted.

In this embodiment, the catalytic reactor includes a first catalytic reactor 500*a* and a second catalytic reactor 500*b* sequentially disposed along a flow direction of the mixture, and the plasma reactor 600 is disposed between the first catalytic reactor and the second catalytic reactor 500*b*.

As described above, since the catalytic reforming reaction is an endothermic reaction, the temperature is gradually lowered as the mixture flows through the catalytic reactor. That is, a temperature T4 after passing through the first catalytic reactor 500*a* gets further lowered than the temperature T2 which is a temperature before the mixture flows into the first catalytic reactor 500*a*. Accordingly, by supplying additional heat by the plasma reactor 600 between the first catalytic reactor 500*a* and the second catalytic reactor 500*b*, it is possible to heat the mixture to a temperature T5 higher than the temperature T4 and sufficiently supply a heat amount required for a continuous reforming reaction in the second catalytic reactor 500*b*.

FIG. 4 is a schematic view illustrating a biogas reformer according to a fourth embodiment of the present disclosure. Referring to FIG. 4, the biogas reformer according to the fourth embodiment has the same configuration as the biogas reformer according to the first embodiment, but is characterized in that the plasma burner 200 and the catalytic reactor 500 are disposed adjacent to each other.

In this embodiment, the catalytic reactor 500 is disposed to enclose the plasma burner 200, and accordingly, the heat of the plasma burner 200 may be directly transferred to the catalytic reactor 500, and the heat may be supplied as uniformly as possible to the catalytic reactor 500. The positional relationship of the first control valve 100, the plasma burner 200, the mixer 400, and the catalytic reactor 500 will be described in more detail below.

In addition, in the present embodiment, the plasma reactor 600 is illustrated as being installed at a front end of the first control valve 100 to heat the biogas feed flowing into the first control valve 100, but is not limited thereto. It is apparent that the plasma reactor 600 may be omitted or installed at another location.

FIG. 5 is a cross-sectional view illustrating in detail a positional relationship of the first control valve, the plasma burner, the mixer, and the catalytic reactor of FIG. 4. Referring to FIG. 5, the plasma burner 200 is provided in the inner housing 20, and the catalytic reactor 500 is provided between the inner housing 20 and the outer housing 10 enclosing the inner housing 20.

Specifically, the outer housing 10 forms a space to accommodate the inner housing 20 and the catalytic reactor 500 therein, and includes the inlet 11 connected to one side of the space and the discharging unit 12 connected to the other side of the space. The inlet 11 introduces the first portion of biogas feed among biogas feeds having $CH_4$ and $CO_2$ as main components, and the discharging unit 12 discharges synthesis gas having CO and $H_2$ as main components, which is generated by the catalytic reforming reaction of biogas in the catalytic reactor 500.

The remaining second portion of biogas feed excluding the first portion is introduced into the plasma burner 200. To this end, a first conduit 51 for supplying the first portion of the biogas feed from the first control valve 100 to the inlet 11 of the outer housing 10, and a second conduit 52 for supplying the second portion of the biogas feed from the first control valve 100 to the plasma burner 200 may be further included.

The second portion of the biogas feed supplied to the plasma burner 200 through the second conduit 52 acts as a fuel and is combusted by an oxidizer supplied to the plasma burner 200 by the oxidizer supply unit 300. When the biogas is burned, flame F may be unstable due to a low calorific value, a fluid flow rate, fluid composition and the like of the biogas, however, the plasma burner 200 may solve the instability of the flame.

The plasma burner 200 is configured to heat the inner housing 20 by forming the flame F through plasma discharge by an oxidizer and the second portion of the biogas feed, and supply the combustion effluents with reduced $CH_4$ and increased $CO_2$ to the inlet 11. To this end, the inner housing 20 has an open end opened toward the inlet 11 in the outer housing 10. At this time, the open end of the inner housing 20 is formed closer to the inlet 11 than to the catalytic reactor 500. For this reason, the combustion effluent generated by the plasma burner 200 and the first portion of the biogas feed introduced through the inlet 11 may be mixed before being introduced into the catalytic reactor 500. That is, the mixer 400 is formed between the inlet 11 and the catalytic reactor 500 inside the outer housing 10.

For smooth mixing of the combustion effluent and the first portion of the biogas feed, the outer housing 10 may be provided in front of the open end of the inner housing 20 and may include a direction shifting member 13 for shifting a direction of the combustion effluent. The direction shifting member 13 collides with the combustion effluent proceeding toward the inlet 11 to shift a traveling direction of the combustion effluent toward an inner surface of the outer housing 10. For this reason, the first portion the biogas feed flowing in from the inlet 11 may be mixed with the combustion effluent that shifted a traveling direction while flowing into the outside of the direction shifting member 13 and supplied to the catalytic reactor 500. As such, since the combustion effluent containing $CO_2$ is mixed with the first portion of the biogas feed, the ratio of $CO_2$:$CH_4$ may be adjusted to 1:1 to 2:1.

The catalytic reactor 500 is provided between the inner housing 20 and the outer housing 10 and communicates with the discharging unit 12. In this embodiment, the catalytic reactor 500 is filled and positioned between the outer surface of the inner housing 20 and an inner surface of the outer housing 10. The outer housing 10 may further include a supporting plate 14 positioned at a rear of the catalytic reactor 500 and interposed between the outer housing 10 and the inner housing 20. The supporting plate 14 is formed as a perforated plate so that it supports the catalytic reactor 500 and reformed synthesis gas can flow to the discharging unit 12.

Since an amount of heat dissipated by the plasma burner 200 heats the inner housing 20 and the catalytic reactor 500, synthesis gas containing CO and $H_2$ as main components may be obtained by reacting $CO_2$ and $CH_4$ of the mixture in the catalytic reactor 500. (reaction formula 2) At this time, due to the characteristic of the endothermic reaction, a temperature at a rear of the catalytic reactor 500, that is, in the discharging unit 12, may become lower than a temperature at a front portion of the catalytic reactor 500, that is, in the inlet 11. As the plasma burner 200 is installed at the rear portion of the catalytic reactor 500 considering the above, it is possible to increase efficiency of the reforming reaction even at the rear portion of the catalytic reactor 500.

FIG. 6 is a cross-sectional view illustrating the plasma burner of FIG. 5 in detail. Referring to FIG. 6, the plasma burner 200 includes a burner housing 220 and an electrode 240. The burner housing 220 is coupled in the inner housing 20 close to the discharging unit 12 of the outer housing 10 and is electrically grounded. That is, the burner housing 220 is installed on an opposite side of the open end of the inner housing 20 and faces the open end.

The electrode 240 is built into the burner housing 220, a high voltage HV being applied thereto, and forms a discharge gap G, and forms a feed passageway 250 connected to the second conduit 52. In addition, the electrode 240 includes the discharging unit 242 taking a convex-shape and forming the discharge gap G and a pillar 244 formed long with a smaller diameter than the discharging unit 242 and connected to the discharging unit 242. The pillar 244 is connected to the high voltage HV and installed in the burner housing 220 in an electrically insulating state with an insulating member 260 interposed therebetween.

The feed passageway 250 includes a first inner passageway 252 that is connected to the second conduit 52 and extends from the pillar 244 toward the discharging unit 242, and a second inner passageway 254 that is connected to first inner passageway 252 and extends toward the burner housing 220.

The plasma burner 200 further includes a swirler 270. The swirler 270 is provided between the pillar 244 and the burner housing 220 at a rear portion of the discharging unit 242 to generate a swirl in the oxidizer of air or oxygen supplied to the discharge gap G such that the second portion of the biogas feed being supplied to the feed passageway 250 and the oxidizer is mixed together.

The discharge gap G is set in the shortest distance between the discharging unit 242 and the burner housing 220. A mixing zone (MZ) is formed between the swirler 270 and the discharge gap G and the swirler 270 induces the oxidizer, thereby the biogas and the oxidizer is mixed in the mixing zone MZ. The swirler 270 and the mixing zone MZ enable ignition of the biogas even under a biogas feed condition of a low calorific value and high fluctuation.

An ignition zone IZ is formed between the discharge gap G and an end of the burner housing 220, an arc is generated in a mixture of the biogas and the oxidizer, and the generated arc is developed, so that the flame F is ejected toward an open end of the inner housing 20. The swirler 270 and the ignition zone IZ enable ignition of the biogas and maintenance of the flame even under a biogas feed condition of a low calorific value and high fluctuation.

That is, the plasma burner 200 enables ignition after mixing. The electrode 240 is supplied to the oxidizer before the ignition point to facilitate mixing of the biogas feed acting as a fuel and the oxidizer. The electrode 240 enables the are to be used for ignition and flame stabilization so that biogas having a low heat amount can stably ignite and maintain the flame. To this end, the electrode 240 generates an arc in a rotating shape in the wake of the swirler 270.

As illustrated in FIG. 5, the flame F of the plasma burner 200 and the high-temperature combustion effluent heat the inner housing 20, and consequently heat the catalytic reactor 500, and flows to the open end of the inner housing 20 and is guided to the catalytic reactor 500 after a direction thereof is shifted by the direction shifting member 13.

That is, the high-temperature combustion effluent is mixed with the first portion of the biogas feed, which is a relatively cold raw material, and raises the temperature and increases the proportion of $CO_2$. The mixed mixture is stably reformed in the catalytic reactor 500. At this time, since the biogas is used as a fuel of the plasma burner 200 and converted into a raw material of the catalytic reactor 500, it is possible to reduce $CO_2$ during biogas reforming.

At this time, the plasma burner 200 is installed inside the catalytic reactor 500 such that the heat produced by the plasma burner 200 during the process of supplying the combustion effluent to the catalytic reactor 500 can be entirely supplied to the catalytic reactor 500 without loss.

FIG. 7 is a cross-sectional view illustrating in detail another embodiment of the plasma burner. By comparing the plasma burner 200 of FIG. 6 with a plasma burner 200' of FIG. 7, a description of the same configuration will be omitted and different configurations compared therewith will be described.

In a feed passageway 250', a first inner passageway 252' is formed to extend beyond a second inner passageway 254 to the end of the discharging unit 242, thereby the combustion effluent is ejected in a longitudinal direction of the first inner passageway 252'.

The fuel supplied via the first inner passageway 252', that is, the second portion of the biogas feed, is injected into a center of the flame F of FIG. 6 and induces a diffusion flame F2 to be elongated in a longitudinal direction. Since the first inner passageway 252' extends to the end of the discharging unit 242, uniform heat transfer is possible to the inner housing 20 and the catalytic reactor 500 in a longitudinal direction.

In addition, since the first inner passageway 252' is formed to extend to the end of the discharging unit 242, heat can be continuously transferred along the longitudinal direction of the catalytic reactor 500, and the diffusion flame F2 that is long can be further formed by supplying the second portion of the biogas feed and the oxidizer in the longitudinal direction of the catalytic reactor 500. Through this fuel supply, the diffusion flame F2 is formed in the center based on the premixed flame F, making it possible to further stabilize the flame.

FIG. 8 is a cross-sectional view illustrating in detail another positional relationship of the first control valve, the plasma burner, the mixer, and the catalytic reactor of FIG. 4. The positional relationship of FIG. 8 is formed in the same manner as that of FIG. 5, but further includes a through hole 21.

Specifically, the inner housing 20 includes a through hole 21 for directly supplying the combustion effluent to the catalytic reactor 500. A plurality of through holes 21 may be provided on an open-end side of the inner housing 20. The plurality of through holes 21 allow the high-temperature combustion effluent to be more uniformly supplied to the catalytic reactor 500 and mixed in the catalytic reactor 500.

FIG. 9 is a cross-sectional view illustrating in detail still another positional relationship of the first control valve, the plasma burner, the mixer, and the catalytic reactor of FIG. 4.

Referring to FIG. 9, the biogas reformer further includes an intermediate housing 30 spaced apart from the outer housing 10 while enclosing the inner housing 20 to form a circulation path P1 in which the combustion effluent circulates therebetween. The catalytic reactor 500 is provided between the inner housing 20 and the intermediate housing 30.

In this embodiment, the plasma burner 200 is coupled to the inner housing 20 from the inlet 11 side of the outer housing 10 to eject the flame F from the inlet 11 toward the discharging unit 12. That is, the inner housing 20 has an open end that is opened toward the discharging unit 12. The combustion effluent generated in the plasma burner 200 flows to the circulation path P1 formed between an outer surface of the intermediate housing 30 and an inner surface of the outer housing 10 and is circulated in the circulation path P1 toward the inlet 11.

To this end, the outer housing 10 divides an inside of the outer housing 10 into a first interior in which the catalytic reactor 500 is disposed and a second interior in which the discharging unit 12 through which the synthesis gas generated in the catalytic reactor 500 is discharged and includes a partition wall 15 forming the circulation path P1. The combustion effluent generated in the plasma burner 200 may be circulated toward the inlet 11 along the circulation path P1 without being discharged to the discharging unit 12 thanks to the partition wall 15. At this time, since the synthesis gas generated in the catalytic reactor 500 must be discharged to the discharging unit 12, a first communication hole 16 through which the catalytic reactor 500 communicates with the second interior is provided to the partition wall 15.

In this embodiment, the intermediate housing 30 is connected to the inner housing 20. Specifically, a perimeter of the inner housing 20 and a perimeter of the intermediate housing 30 are connected by a connecting portion 40 on an opposite side to the inlet 11. At this time, the connecting portion 40 may be spaced apart from the partition wall 15 to form a communication flow path P2 through which the combustion effluent flows to the circulation path P1. In addition, the connecting portion 40 is provided with a second communication hole 16 that is connected to the first communication hole 16 and through which the catalytic reactor 500 communicates with the second interior such that the synthesis gas generated in the catalytic reactor 500 can be discharged to the discharging unit 12. The first communication hole 16 and the second communication hole 42 may be formed in plurality along a circumferential direction of the partition wall 15 and the connecting portion 40, respectively, and may be formed in the same number in the same position.

For this reason, the combustion effluent generated in the plasma burner 200 is discharged to the open end of the inner housing 20 and circulates toward the inlet 11 through the communication flow path P2 and the circulation path P1, and the combustion effluent is mixed in the mixer 400 with the first portion of the biogas feed introduced through the inlet 11 and then supplied to the catalytic reactor 500. Thereafter, the mixture is converted into synthesis gas through a catalytic reforming reaction in the catalytic reactor 500 and then discharged to the discharging unit 12 through the second communication hole 42 and the first communication hole 16.

In another embodiment, if the inner housing 20 and the intermediate housing 30 extend to the partition wall 15 and are connected to the partition wall 15, and a space between the inner housing 20 and the intermediate housing 30 is communicated with the first communication hole 16 of the partition wall, a communication flow path communicating with an inside of the inner housing 20 and the circulation path P1 may be formed by passing through the catalytic reactor 500.

The outer housing 10 may further include a guide wall 17 that is provided to protrude inward from the outer housing 10 at a front of the catalytic rector 500, and guides the combustion effluent circulating toward the inlet 11 to the catalytic reactor 500. The guide wall 17 guides the combustion effluent in the circulation path P1 to be introduced into the catalytic reactor 500 without exiting to the inlet 11, and allows it to be mixed with the first portion of the biogas feed being supplied to an inside of the guide wall 17.

In this way, the temperature of the catalytic reactor 500 can be optimized as both an inside and an outside of the catalytic reactor 500 are surrounded by the flame and the combustion effluent. That is, the amount of heat dissipated by the plasma burner 200 and the combustion effluent circulating to the circulation path P1 heats the inner housing 20, the intermediate housing 30 and the catalytic reactor 500, thereby a heat amount for the catalytic reforming reaction is effectively obtained. Moreover, the circulation path P1 may prevent heat loss from the catalytic reactor 500 to the outside such that a constant temperature of the catalytic reactor 500 can be maintained.

FIG. 10 is a cross-sectional view of the biogas reformer in detail according to a fifth embodiment of the present disclosure. The biogas reformer of FIG. 10 includes the same positional relationship as that of FIG. 5, but not only the plasma burner 200 and the catalytic reactor 500 are integrally formed, but also the plasma reactor 600 is integrally formed therein.

Specifically, the plasma reactor 600 is installed in the inlet 11 of the outer housing 100 to heat the first portion of the biogas feed introduced through the inlet 11. In this way, when the second portion of the biogas feed supplied to the plasma burner 200 fluctuates or a heat amount is insufficient, the plasma reactor 600 adjunctively heats the first portion of the biogas feed such that the catalytic reactor 500 enables smooth reforming.

For example, when the plasma reactor 600 uses arc jet plasma, the first portion of the biogas feed may be heated by high-temperature discharge gas through the arc jet. As another example, when the plasma reactor 600 uses a high-frequency inductively coupled plasma, it is possible to generate the plasma by means of a radio frequency to meet the first portion of the biogas feed at a rear end of the high-frequency inductively coupled plasma (ICP) discharge. By doing so, stability of ICP operation can be ensured. As another example, when the plasma reactor 600 uses microwave plasma, it is possible to generate the plasma by means of microwave band to meet the first portion of the biogas feed.

However, the present disclosure is not limited thereto, and the plasma reactor 600 may be installed in the mixer 400 of the outer housing 100 to heat the mixture mixed in the mixer 400.

Although preferred embodiments of the present disclosure have been described above, the present disclosure is not limited thereto, and may be embodied by being modified in various ways within the scope of the claims, the detailed description, and the accompanying drawings. It is apparent that such modifications fall within the scope of the present disclosure.

INDUSTRIAL APPLICABILITY

The present disclosure provides a biogas reformer in which a portion of biogas feed can be combusted in a burner to supply the required heat amount to a catalytic reactor without supplying heat from an external heat source, and the $CO_2$:$CH_4$ ratio can be adjusted to be advantageous for a catalytic reforming reaction of the biogas by supplying a combustion effluent together with the biogas feed to the catalytic reactor.

The invention claimed is:

1. A biogas reformer comprising:

a first control valve for branching biogas feed mainly composed of methane and carbon dioxide into a first portion and a second portion;

a burner receiving the second portion of the biogas feed branched through the first control valve and burning the second portion of the biogas feed to generate a high-temperature combustion effluent mainly composed of carbon dioxide and water;

a mixer in which the first portion of the biogas feed branched through the first control valve and the combustion effluent generated from the burner are mixed; and a catalytic reactor allowing a mixture mixed in the mixer to be introduced thereinto and generating synthesis gas containing carbon monoxide and hydrogen as main components through a catalytic reforming reaction, wherein the burner is provided in an inner housing, and the catalytic reactor is provided between the inner housing and an outer housing enclosing the inner housing, wherein the biogas reformer further comprises:

a first conduit for supplying the first portion of the biogas feed from the first control valve to an inlet of the outer housing; and a second conduit for supplying the second portion of the biogas feed from the first control valve to the burner, and wherein the mixer is formed between the inlet and the catalytic reactor inside the outer housing.

2. The biogas reformer of claim 1, wherein a ratio of carbon dioxide ($CO_2$):methane ($CH_4$) of the mixture mixed in the mixer is 1:1 to 2:1.

3. The biogas reformer of claim 1, further comprising:

an oxidizer supply unit for supplying an oxidizer for combustion to the burner.

4. The biogas reformer of claim 1, further comprising:
a plasma reactor for heating the biogas feed or the mixture mixed in the mixer to supply heat to the catalytic reactor.

5. The biogas reformer of claim 4, further comprising:
a second control valve for branching a portion of the biogas feed or the mixture mixed in the mixer and supplying the portion to the plasma reactor.

6. The biogas reformer of claim 5,
wherein the catalytic reactor comprises a first catalytic reactor and a second catalytic reactor sequentially disposed along a flow direction of the mixture, and
wherein the plasma reactor is disposed between the first catalytic reactor and the second catalytic reactor.

7. The biogas reformer of claim 1,
wherein the burner is a plasma burner that is ignited by plasma and a flame is maintained by plasma.

8. The biogas reformer of claim 7,
wherein the burner comprises:
a burner housing coupled to the inner housing and electrically grounded thereto; and
an electrode built into the burner housing, to which a high voltage being applied, forming a discharge gap, and forming a feed passageway connected to the second conduit.

9. The biogas reformer of claim 8,
wherein the electrode comprises:
a discharging unit taking a convex-shape and forming the discharge gap, and
a pillar formed with a smaller diameter than the discharging unit and connected to the discharging unit, and
wherein the feed passageway comprises:
a first inner passageway connected to the second conduit and extending from the pillar toward the discharging unit, and
a second inner passageway connected to the first inner passageway within the discharging unit and extending toward the burner housing.

10. The biogas reformer of claim 9,
wherein the first inner passageway extends to an end of the discharging unit through the second inner passageway.

11. The biogas reformer of claim 1,
wherein the inner housing has an open end open toward the inlet, and
wherein the outer housing comprises a direction shifting member provided in front of the open end of the inner housing to change a traveling direction of the combustion effluent.

12. The biogas reformer of claim 11,
wherein the inner housing comprises a through-hole for supplying the combustion effluent to the catalytic reactor.

13. The biogas reformer of claim 1, further comprising:
an intermediate housing enclosing the inner housing,
wherein the catalytic reactor is provided between the inner housing and the intermediate housing, and
wherein the combustion effluent is flowed to a circulating flow path formed between an outer surface of the intermediate housing and an inner surface of the outer housing and is circulated toward the inlet in the circulating flow path.

14. The biogas reformer of claim 13,
wherein the outer housing separates an interior of the outer housing into a first interior in which the catalytic reactor is disposed and a second interior in which the discharging unit through which the synthesis gas generated in the catalytic reactor is discharged is disposed, and comprises a partition wall forming the circulating flow path, and
wherein a first communication hole through which the catalytic reactor communicates with the second interior is provided in the partition wall.

15. The biogas reformer of claim 14,
wherein a perimeter of the inner housing and a perimeter of the intermediate housing are connected by a connecting portion on an opposite side to the inlet,
wherein the connecting portion is spaced apart from the partition wall to form a communication flow path through which the combustion effluent is flowed to the circulating flow path, and
wherein the connecting portion is provided with a second communication hole connected to the first communication hole and through which the catalytic reactor communicates with the second interior.

16. The biogas reformer of claim 13,
wherein the outer housing comprises a guide wall provided to protrude inward from the outer housing from a front of the catalytic reactor and guiding the combustion effluent circulated toward the inlet to the catalytic reactor.

17. The biogas reformer of claim 1, further comprising:
a plasma reactor installed in the outer housing to heat the first portion of the biogas feed introduced through the inlet or the mixture mixed in the mixer.

* * * * *